(12) United States Patent
Shimamura et al.

(10) Patent No.: US 11,448,304 B2
(45) Date of Patent: Sep. 20, 2022

(54) PULLEY STRUCTURE

(71) Applicant: Mitsuboshi Belting Ltd., Kobe (JP)

(72) Inventors: Hayato Shimamura, Hyogo (JP); Katsuya Imai, Hyogo (JP); Ryosuke Dan, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 939 days.

(21) Appl. No.: 16/096,139

(22) PCT Filed: Apr. 27, 2017

(86) PCT No.: PCT/JP2017/016771
§ 371 (c)(1),
(2) Date: Oct. 24, 2018

(87) PCT Pub. No.: WO2017/188389
PCT Pub. Date: Nov. 2, 2017

(65) Prior Publication Data
US 2019/0136957 A1  May 9, 2019

(30) Foreign Application Priority Data

Apr. 28, 2016 (JP) .............................. JP2016-090836
Apr. 17, 2017 (JP) .............................. JP2017-081321

(51) Int. Cl.
*F16H 55/36* (2006.01)
*F16D 41/20* (2006.01)

(52) U.S. Cl.
CPC ........... *F16H 55/36* (2013.01); *F16D 41/206* (2013.01)

(58) Field of Classification Search
CPC .. F16H 2055/366; F16H 55/36; F16D 41/206; F16F 15/1216

USPC ....................................................... 474/94, 70
See application file for complete search history.

(56) References Cited

U.S. PATENT DOCUMENTS

| | | | | |
|---|---|---|---|---|
| 2,595,454 A | * | 5/1952 | Greenlee | F16D 7/022 464/40 |
| 8,021,253 B2 | * | 9/2011 | Dell | F16H 7/00 474/74 |
| 8,177,669 B2 | * | 5/2012 | Ishida | F16D 41/206 474/94 |

(Continued)

FOREIGN PATENT DOCUMENTS

| CN | 103649595 A | 3/2014 |
|---|---|---|
| CN | 104428563 A | 3/2015 |

(Continued)

OTHER PUBLICATIONS

Jul. 16, 2020—(IN) Examination Report—App 201817038150.

(Continued)

*Primary Examiner* — Henry Y Liu
(74) *Attorney, Agent, or Firm* — Banner & Witcoff, Ltd.

(57) ABSTRACT

A pulley structure may be equipped with an outer rotating body, an inner rotating body, and a coil spring. The pulley structure has a cross section of the spring wire of the coil spring along a direction running along the rotational axis and parallel to the rotational axis being a trapezoidal shape, and the length of an inner-diameter-side portion in the rotational axis direction in the cross section being greater than the length of an outer-diameter-side portion in the rotational axis direction in the cross section.

2 Claims, 6 Drawing Sheets

(56) References Cited

U.S. PATENT DOCUMENTS

| | | | | |
|---|---|---|---|---|
| 8,506,434 | B2* | 8/2013 | Harvey | F16D 47/02 |
| | | | | 474/94 |
| 8,602,928 | B2* | 12/2013 | Serkh | F16H 55/36 |
| | | | | 474/70 |
| 8,820,503 | B2* | 9/2014 | Schneider | F16D 41/206 |
| | | | | 192/55.5 |
| 8,951,153 | B2* | 2/2015 | Ishida | F16D 43/18 |
| | | | | 474/94 |
| 9,033,832 | B1* | 5/2015 | Serkh | F02B 67/06 |
| | | | | 474/70 |
| 2009/0197719 | A1* | 8/2009 | Ali | F16H 55/36 |
| | | | | 474/94 |
| 2010/0116617 | A1* | 5/2010 | Serkh | F16H 55/36 |
| | | | | 192/41 S |
| 2011/0065537 | A1* | 3/2011 | Serkh | F16F 15/1216 |
| | | | | 474/94 |
| 2011/0245000 | A1* | 10/2011 | Serkh | F16F 15/1217 |
| | | | | 474/94 |
| 2012/0015768 | A1* | 1/2012 | Serkh | F16H 55/36 |
| | | | | 474/94 |
| 2013/0037370 | A1* | 2/2013 | Marion | F16D 41/206 |
| | | | | 192/55.5 |
| 2013/0150191 | A1* | 6/2013 | Ishida | F16H 55/36 |
| | | | | 474/94 |
| 2013/0237351 | A1* | 9/2013 | Marion | F16F 15/1216 |
| | | | | 474/70 |
| 2013/0324335 | A1* | 12/2013 | Chen | F16D 13/76 |
| | | | | 474/94 |
| 2014/0083812 | A1* | 3/2014 | Ogushi | F16D 41/066 |
| | | | | 192/41 R |
| 2015/0184703 | A1* | 7/2015 | Shimamura | F16H 55/36 |
| | | | | 192/41 S |
| 2015/0226309 | A1* | 8/2015 | Marion | F16D 3/12 |
| | | | | 474/94 |
| 2015/0252884 | A1* | 9/2015 | Serkh | F16D 41/206 |
| | | | | 474/94 |
| 2016/0040771 | A1* | 2/2016 | Ward | F16H 55/38 |
| | | | | 474/94 |
| 2016/0169302 | A1* | 6/2016 | Mori | F16F 15/123 |
| | | | | 474/166 |

FOREIGN PATENT DOCUMENTS

| | | |
|---|---|---|
| CN | 105074282 A | 11/2015 |
| JP | S57-117426 U | 7/1982 |
| JP | 2008-019959 A | 1/2008 |
| JP | 2012-112480 A | 6/2012 |
| JP | 2013-527401 A | 6/2013 |
| JP | 2014-114947 A | 6/2014 |
| JP | 5772119 B2 | 9/2015 |
| JP | 2018-100732 A | 6/2018 |
| WO | 2013-191240 A1 | 12/2013 |
| WO | 2014/022912 A1 | 2/2014 |
| WO | 2016/037283 A1 | 3/2016 |
| WO | 2018/194075 A1 | 10/2018 |

OTHER PUBLICATIONS

Sep. 16, 2020—(ID) Office Action—App P00201808426, Eng Tran.
Sep. 27, 2019—(CA) Office Action—CA App 3,017,470.
Oct. 18, 2019—(EP) Extended European Search Reproart—EP App 17789671.9.
Oct. 27, 2020—(EP) Office Action—EP App 17789671.9.
Jul. 11, 2017—International Search Report—Intl App PCT/JP2017/016771.
Dec. 4, 2018—(JP) Notification of Reasons for Refusal—App 2017-081321, Eng Tran.
Aug. 30, 2021—(CN) Notification of the Second Office Action—App 201780025084.6, Eng Tran.
Dec. 31, 2020—(CN) Notification of First Office Action—App 201780025084.6, Eng Tran.
Nov. 11, 2021—(EP) Office Action—EP App 17789671.9.
Nov. 4, 2021—(BR) Preliminary Office Action—BR App BR1120180722251, Eng Tran (Published in BR Gazette RPI 2664 on Jan. 25, 2022).
Feb. 28, 2022—(CN) Notification of the Third Office Action—App 201780025084.6, Eng Tran.
Jun. 23, 2022—(MY) Office Action—App PI2018703296.

\* cited by examiner

[FIG. 1]
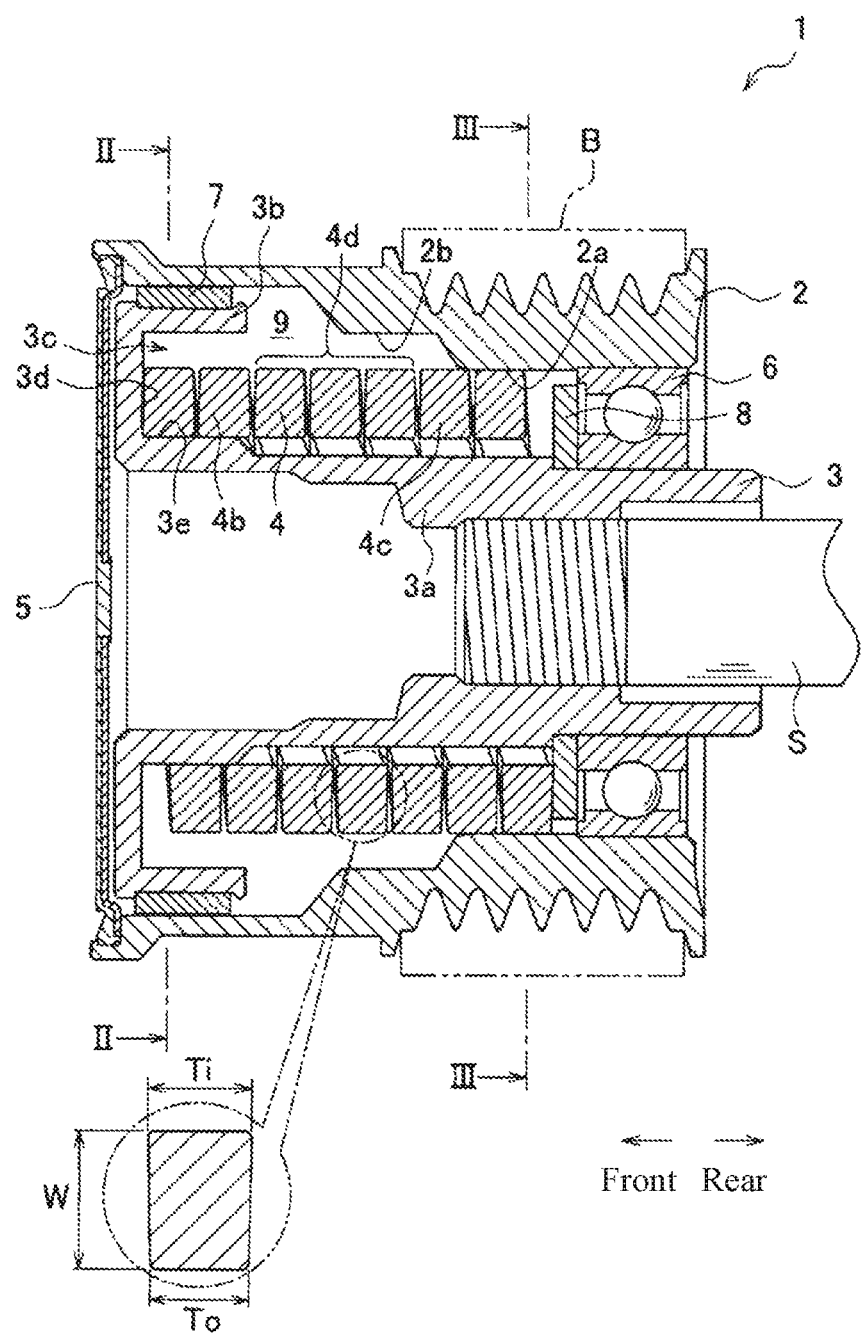
Front  Rear

[FIG. 2]
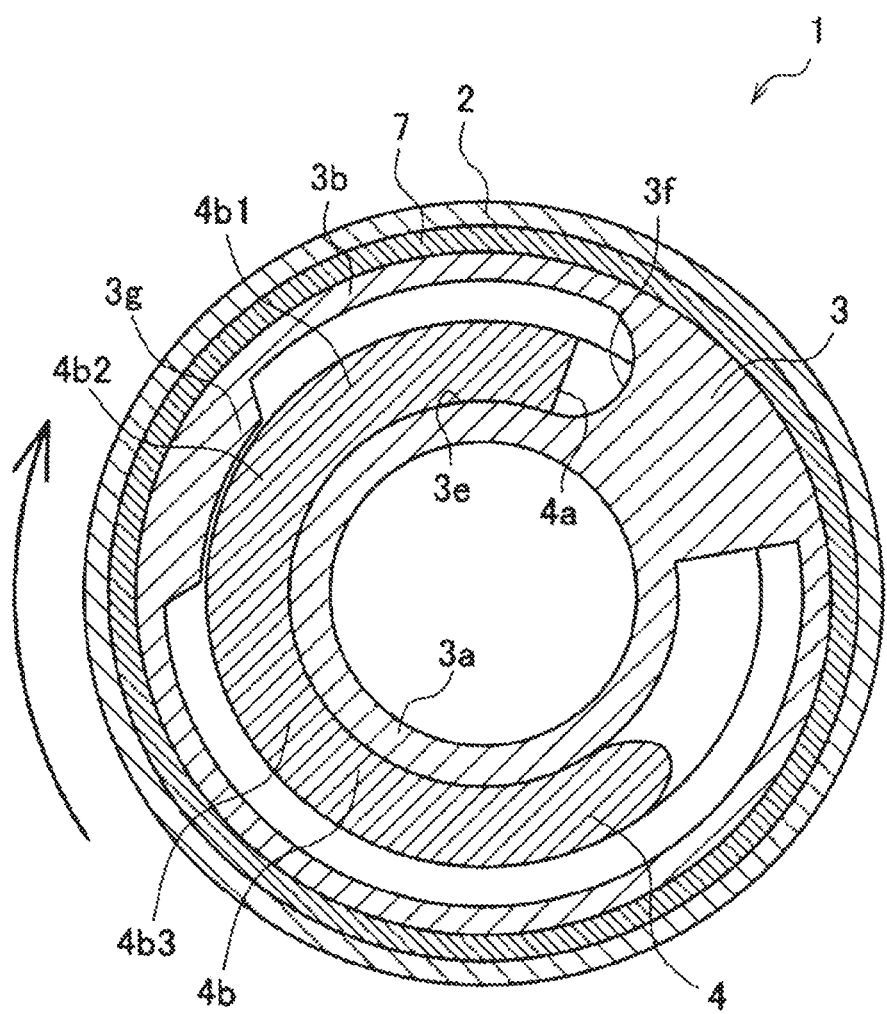

[FIG. 3]
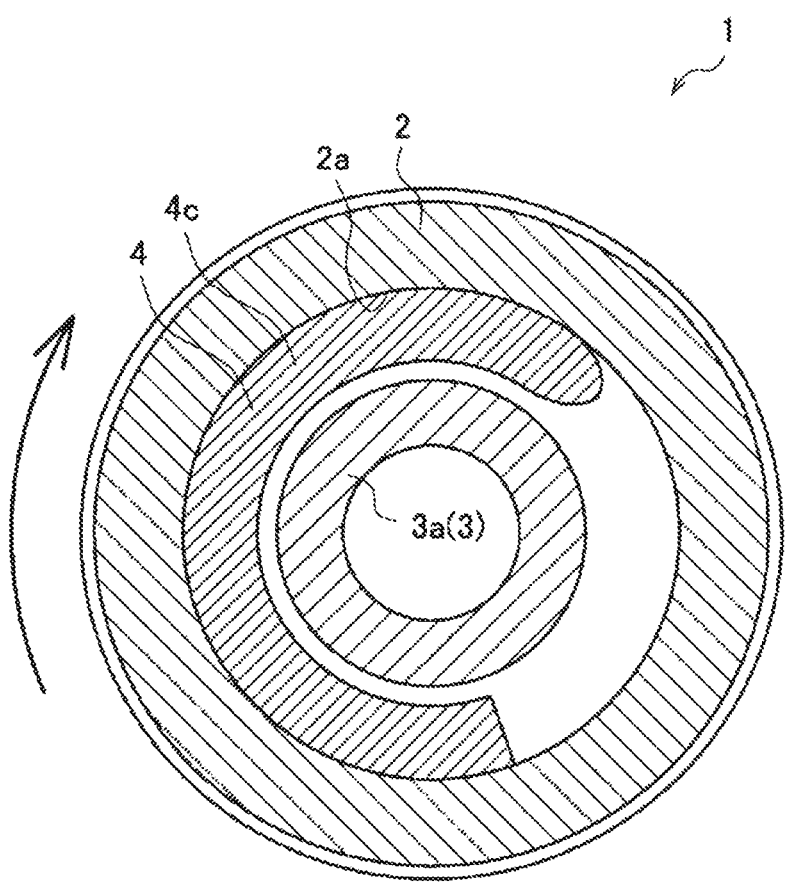

[FIG. 4]
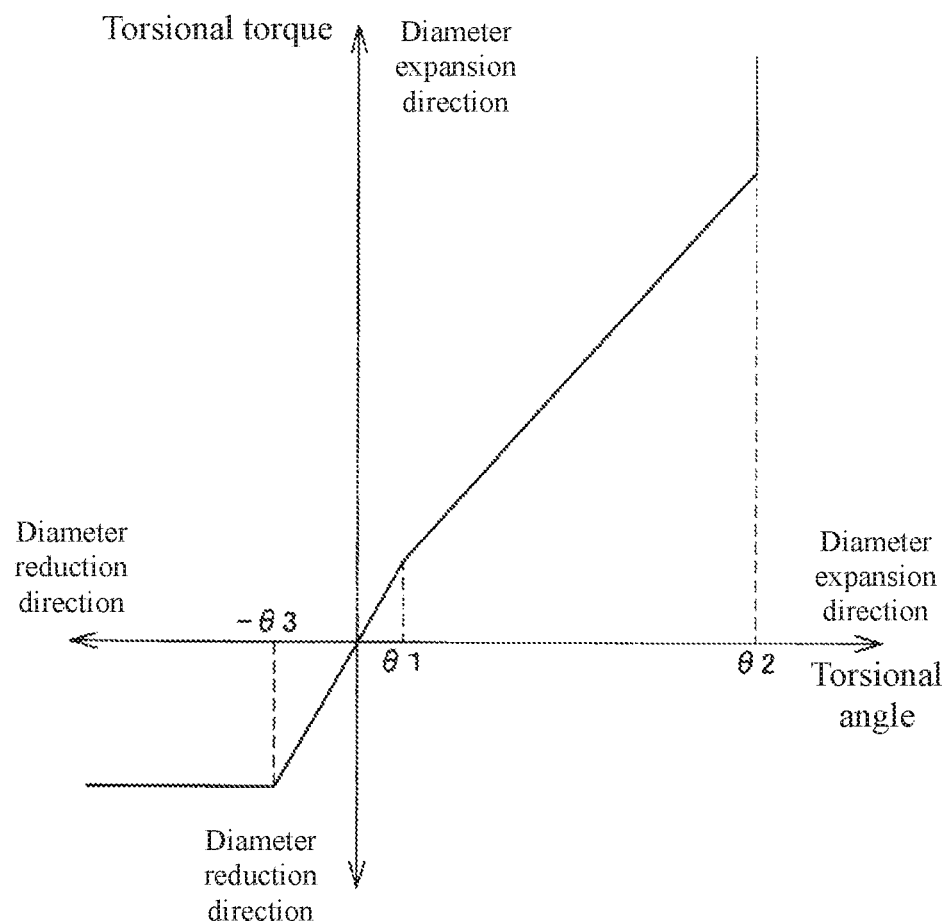

[FIG. 5]
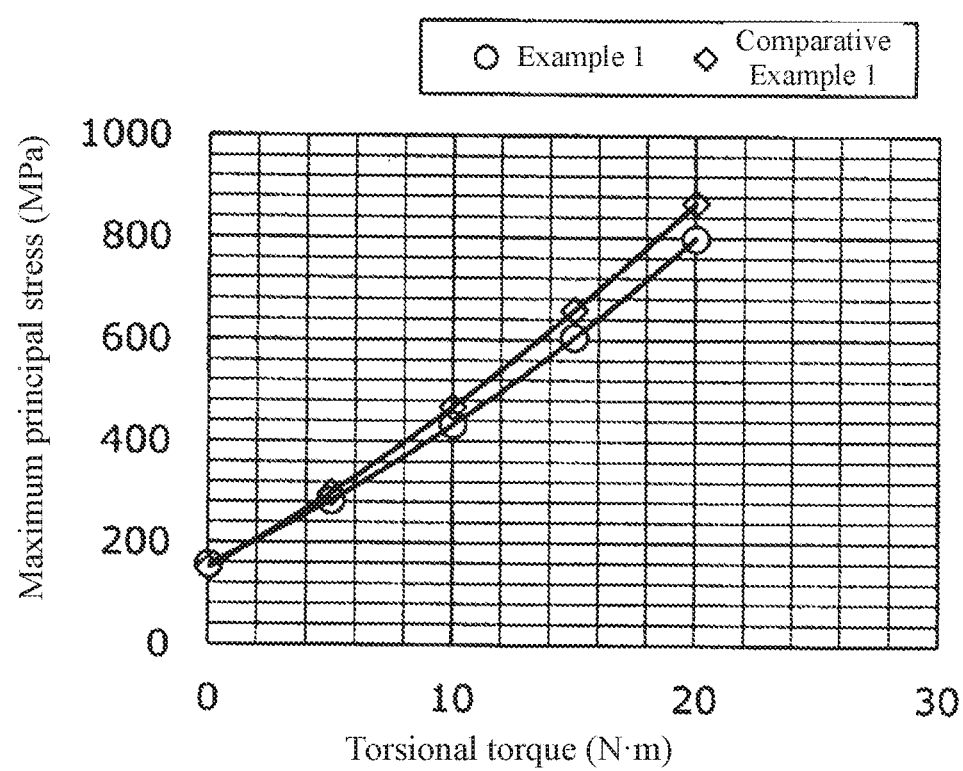

[FIG. 6]
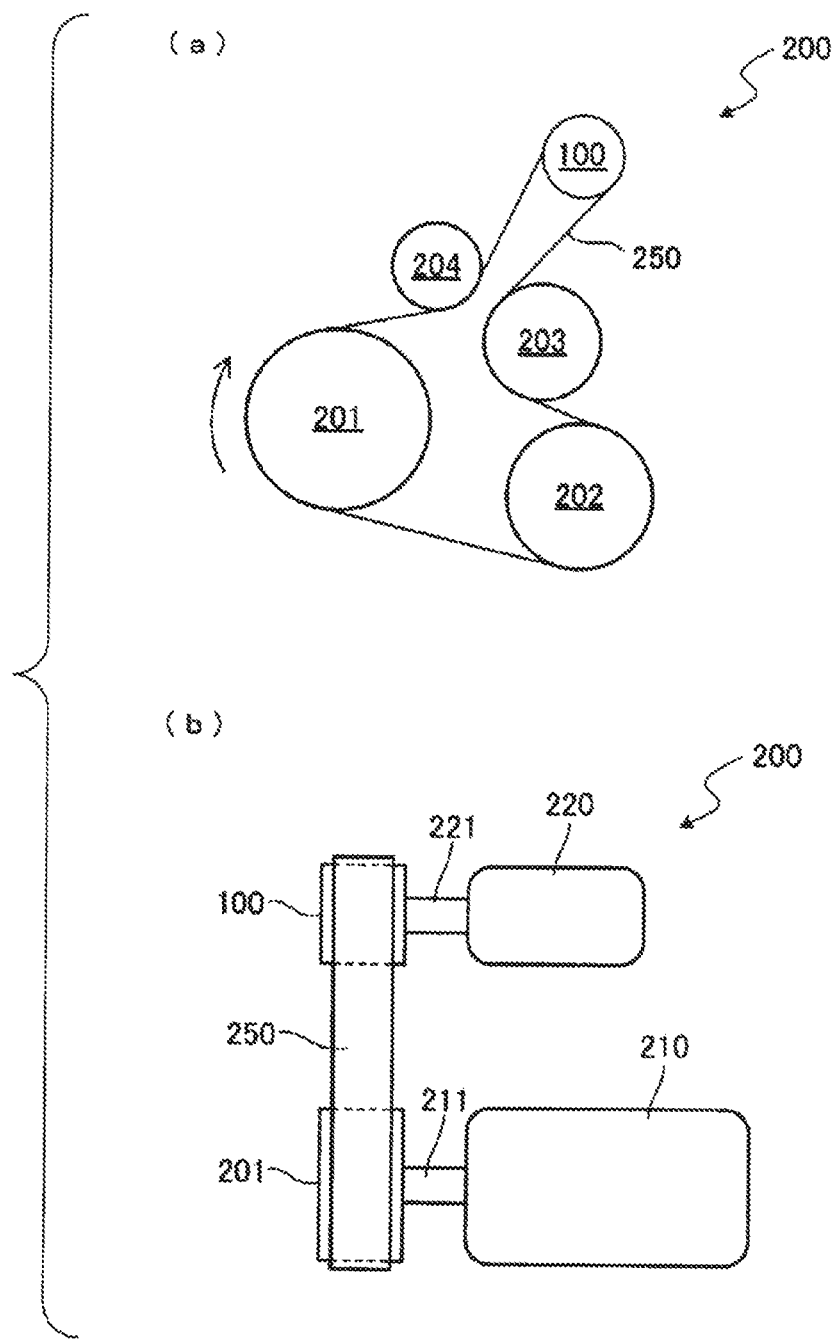

PULLEY STRUCTURE

TECHNICAL FIELD

The present invention relates to a pulley structure with a coil spring.

BACKGROUND ART

In an accessory-driving unit which drives an accessory machine such as an alternator by the power of an engine of a vehicle or the like, a belt is wound around a pulley connected to a driving shaft of the accessory machine such as an alternator and a pulley connected to a crankshaft of the engine. And torque of the engine is transmitted to the accessory machine through the belt. A pulley structure disclosed in, for example, PTL 1 to PTL 3, capable of absorbing rotational fluctuation of a crankshaft is used, in particular, as a pulley connected to a driving shaft of an alternator having inertia greater than that of other accessory machines.

The pulley structures disclosed in PTL 1 to PTL 3 are pulley structures including an outer rotating body, an inner rotating body which is provided on the inside of the outer rotating body and relatively rotatable with respect to the outer rotating body, and a coil spring, and the torque is transmitted or blocked between the outer rotating body and the inner rotating body due to diameter expansion or reduction deformation of the coil spring. In order to prevent breakage due to diameter expansion deformation of the coil spring, these pulley structures include a mechanism (hereinafter, referred to as a lock mechanism) in which further diameter expansion deformation of the coil spring is restricted and two rotating bodies rotate integrally with the coil spring when the outer circumferential surface of a free part of the coil spring abuts against the outer rotating body. Furthermore, in order to prevent the belt wound around the outer rotating body from slipping, the coil spring of these pulley structures functions as a one-way clutch (coil spring clutch) which transmits or blocks the torque in one direction between the outer rotating body and the inner rotating body.

In the pulley structures described in PTL 1 to PTL 3, when focusing on a cross-sectional shape of a spring wire of the coil spring (hereinafter, a spring cross-sectional shape), in each of the drawings, PTL 1 can be seen as a square shape and the embodiments of PTL 2 and PTL 3 can be seen as a trapezoidal shape. In PTL 2 and PTL 3, reference is made to a rectangular (square) shape as a cross-sectional shape of the coil spring, but reference to a trapezoidal shape (reason and base for adoption thereof) is not found.

CITATION LIST

Patent Literature

PTL 1: JP-A 2014-114947
PTL 2: JP-T 2013-527401
PTL 3: US 2013/0237351

SUMMARY OF INVENTION

Technical Problem

In the pulley structure which transmits or blocks the torque between the outer rotating body and the inner rotating body by expanding or reducing the diameter of the coil spring, when the torsional deformation of the coil spring in a diameter expansion direction (hereinafter, diameter expansion deformation) and the maximization (corresponding to the torsional angle at which the lock mechanism operates) thereof are excessively repeated, there is a concern that cracks or breakages are generated on a surface (particularly, an inner circumferential surface) of the coil spring due to the bending stress generated on the surface (particularly, the inner circumferential surface) of the coil spring to which a tensile force acts. Accordingly, compared to the case where the diameter expansion deformation of the coil spring is not excessively repeated, the durability against torsion (torsional deformation in the diameter expansion direction and in the diameter reduction direction) of the coil spring deteriorates. In particular, in the case where the pulley structure is a pulley for an alternator, the frequency at which the torsional torque input to the pulley becomes the maximum is high. Accordingly, in particular, in the case where the pulley structure is a pulley for an alternator, the durability against torsion of the coil spring is most likely to deteriorate under the operating condition in which the diameter expansion deformation of the coil spring and the maximization thereof are excessively repeated. Specifically, it is considered that the torsional torque input to the pulley for an alternator includes the torsional torque accompanying the engine rotation fluctuation, the torsional torque accompanying the power generation load of the alternator, as well as the instantaneous torsional torque generated at the time of initiating and abruptly accelerating and decelerating the engine, and the like. The operating condition in which the durability against torsion of the coil spring is most likely to deteriorate is the time of initiating the engine. In other words, the operating condition in which the durability against torsion of the coil spring is most likely to deteriorate is the operating condition in which the initiating and stopping of the engine are repeated.

When increasing the number of windings and the wire diameter of the coil spring, the durability of the coil spring increases, but it becomes difficult to dispose the pulley structure in a limited space in an engine accessory-driving system since the size of the pulley structure increases. Therefore, it is required that the durability against torsion of the coil spring can be ensured without increasing the size of the pulley structure, even in the case where the pulley structure is applied to a pulley for an alternator having a high frequency at which the input torsional torque becomes the maximum, and even when the diameter expansion deformation of the coil spring and the maximization thereof are excessively repeated according to the operating condition in which the initiating and stopping of the engine are repeated.

The one-way clutch (coil spring) is engaged with each of the outer rotating body and the inner rotating body and transmits torque between the outer rotating body and the inner rotating body, when the inner rotating body relatively rotates with respect to the outer rotating body in a forward direction. Meanwhile, when the inner rotating body relatively rotates with respect to the outer rotating body in a reverse direction, the one-way clutch is in a disengaged state, slides (slips) with respect to the outer rotating body and/or the inner rotating body and does not transmit torque between the outer rotating body and the inner rotating body. Due to the sliding, in particular, the part which slides on the clutch (coil spring) in the outer rotating body and/or the inner rotating body wears. In addition, due to the sliding, the part which slides on the outer rotating body and/or the inner rotating body in the clutch (coil spring) can also wear. In the case where the part which slides on the clutch (coil spring) in the outer rotating body and/or the inner rotating body has worn, when the clutch is in an engaged state, since the contact pressure between the clutch and the outer rotating body and/or the inner rotating body decreases, the transmitted torque value decreases.

The present invention has been made in view of the above-described problems, and is to provide a pulley structure capable of ensuring durability against torsion of a coil spring and suppressing wear of a part which slides on the coil spring in the outer rotating body and/or the inner rotating body without causing an increase in size of the pulley structure at least in a rotation axis direction, even when diameter expansion deformation of the coil spring and the maximization thereof are excessively repeated.

Solution to Problem

The pulley structure according to the present invention is a pulley structure including: a cylindrical outer rotating body around which a belt is to be wound; an inner rotating body provided on the inside of the outer rotating body and relatively rotatable with respect to the outer rotating body around a common rotation axis with the outer rotating body; and a coil spring provided between the outer rotating body and the inner rotating body, in which the pulley structure further includes a lock mechanism configured such that further torsional deformation in a diameter expansion direction of the coil spring is restricted and the outer rotating body and the inner rotating body rotate integrally with the coil spring when an outer circumferential surface of a free part of the coil spring abuts against the outer rotating body due to diameter expansion of the coil spring, in which the coil spring functions as a one-way clutch which is engaged with each of the outer rotating body and the inner rotating body due to torsional deformation in the diameter expansion direction to transmit torque between the outer rotating body and the inner rotating body when the inner rotating body relatively rotates with respect to the outer rotating body in a forward direction, and which slides with respect to at least one of the outer rotating body and the inner rotating body due to torsional deformation in the diameter reduction direction and does not transmit torque between the outer rotating body and the inner rotating body when the inner rotating body relatively rotates with respect to the outer rotating body in a reverse direction, in which a spring wire of the coil spring has a trapezoidal shape in a cross-section along a direction passing through the rotation axis and parallel to the rotation axis, and has a rotation axis direction length Ti [mm] at an inner diameter side part on the cross-section longer than a rotation axis direction length To [mm] at an outer diameter side part on the cross-section, and in which, when the number of windings of the coil spring is N, the following expression (1) is satisfied:

$$N \times (Ti-To)/2 < 1 \ldots \quad (1).$$

The spring wire of the coil spring is a trapezoidal wire having a trapezoidal cross-sectional shape, and the rotation axis direction length Ti at the inner diameter side part on which a tensile force acts during the diameter expansion deformation (torsional deformation in the diameter expansion direction) is longer than the rotation axis direction length To at the outer diameter side part on which a compression force acts during the diameter expansion deformation. Accordingly, compared to the case where the spring wire is a round wire (a spring wire having a circular cross-sectional shape) with the same sectional area as that of the present invention or is an angular wire (a spring wire having a square or rectangular cross-sectional shape) with the same sectional area and the same radial direction length as those of the present invention, the spring wire can bring a neutral axis which does not receive tension nor compression closer to the inner circumferential surface of the coil spring on which the tensile force acts during the diameter expansion deformation, in the cross-section of the spring wire. Since the bending stress is proportional to the distance from the neutral axis, by bringing the neutral axis closer to the inner circumferential surface of the coil spring on which the tensile force acts during the diameter expansion deformation, it is possible to reduce the maximum value of the bending stress generated on the inner circumferential surface of the coil spring on which the tensile stress acts during the diameter expansion deformation.

Furthermore, as the spring wire is a trapezoidal wire, compared to a round wire having the same sectional area or an angular wire having the same sectional area and the same radial direction length, it is possible to increase the section modulus. As the section modulus increases, the bending stress decreases. Therefore, compared to the case where the spring wire is a round wire having the same sectional area or an angular wire having the same sectional area and the same radial direction length, it is possible to further reduce the maximum value of the bending stress generated on the inner circumferential surface of the coil spring on which the tensile force acts during the diameter expansion deformation.

Therefore, even when the diameter expansion deformation of the coil spring and the maximization thereof are excessively repeated according to the operating condition in which the initiating and stopping of the engine are repeated, compared to the case where the spring wire is a round wire or an angular wire having the same sectional area, it is possible to lower the maximum value of the bending stress generated on the surface (particularly, the inner circumferential surface) of the coil spring on which the tensile force acts during the diameter expansion deformation. Accordingly, the strength and the yield strength (bending rigidity) against instantaneous torsional torque generated at the time of initiation or the like can increase, and the limit value of the torsional angle of the coil spring in the diameter expansion direction can also increase. Furthermore, durability against torsion of the coil spring can be ensured.

Compared to an angular wire having the same sectional area, the same radial direction length and a different axial direction length, the spring wire of the trapezoidal wire has a length in the rotation axis direction of longer by (Ti−To)/2. Accordingly, compared to the case where the spring wire is the angular wire having the same sectional area, the same radial direction length and a different axial direction length, the coil spring has a natural length in the rotation axis direction being longer by ΔL (ΔL=N×(Ti−To)/2).

However, in the present invention, the increase amount ΔL (ΔL=N×(Ti−To)/2) of the natural length of the coil spring in the rotation axis direction is as small as less than 1 mm. Therefore, when incorporating the coil spring into the pulley structure, by adjusting a compression amount of the coil spring in the axial direction (i.e., by adjusting a gap between adjacent spring wires in the rotation axis direction), the size of the pulley structure may not increase in the rotation axis direction compared to the case where the spring wire is an angular wire having the same sectional area, the same radial direction length and a different axial direction length.

Therefore, in the pulley structure of the present invention, even when the diameter expansion deformation of the coil spring and the maximization thereof are excessively repeated, durability against torsion of the coil spring can be ensured without causing an increase in size of the pulley structure at least in the rotation axis direction.

The coil spring is formed by spirally winding (coiling) the spring wire. There is a case where a phenomenon occurs that the outer diameter side part (a surface on the outer diameter side) on the cross-section of the spring wire becomes an inclined surface inclined slightly (e.g., 1°) with respect to the outer diameter reference line parallel to the center axial line of the coil spring (hereinafter, referred to as wire inclination) after coiling. The wire inclination of the coil spring becomes larger as a flattening ratio (axial direction length T of spring wire/radial direction length W of spring wire) of the spring wire of the coil spring becomes smaller. Therefore, by using a trapezoidal wire as the spring wire, compared to the case where an angular wire having the same sectional area, the same radial direction length and a different axial direction length is used as the spring wire, the maximum length in the rotation axis direction in the cross-section of the spring wire increases and the wire inclination can be suppressed.

Furthermore, since the rotation axis direction length Ti of the inner diameter side part is longer than the rotation axis direction length To of the outer diameter side part, the neutral axis on which neither tensile stress nor compressive stress generates becomes close to the inner diameter side part having a long rotation axis direction length from the center in the radial direction in the cross-section of the spring wire. Accordingly, it is possible to further suppress the wire inclination.

Suppression of the wire inclination reduces a surface pressure which acts on the part that slides on the coil spring in the outer rotating body and/or the inner rotating body when the one-way clutch is in a disengaged state. Therefore, it is possible to suppress wear of the part that slides on the coil spring in the outer rotating body and/or the inner rotating body.

As above, it is possible to realize a pulley structure which is capable of ensuring durability against torsion of the coil spring and suppressing wear of the part that slides on the coil spring in the outer rotating body and/or the inner rotating body without causing an increase in size of the pulley structure at least in the rotation axis direction, even when diameter expansion deformation of the coil spring and the maximization thereof are excessively repeated.

In addition, in the present invention, the case where the cross-section of the spring wire has a trapezoidal shape includes the case where the four corners of the cross-section of the spring wire have chamfered shapes (C surface or R surface).

In the pulley structure of the present invention, it is preferable that the spring wire of the coil spring has a radial direction length in the cross-section longer than the rotation axis direction length Ti of the inner diameter side part in the cross-section.

According to the configuration, a section modulus becomes larger as compared to the case where the cross-sectional shape of the spring wire material is a trapezoidal shape with the radial direction length W shorter than or equal to the rotation axis direction length Ti of the inner diameter side part and with the same sectional area. Therefore, from the relationship between the bending stress and the section modulus (bending stress σ=bending moment M/section modulus Z), it is possible to further reduce the maximum value of bending stress generated on the inner circumferential surface of the coil spring on which the tensile force acts during the diameter expansion deformation. As a result, durability against torsion of the coil spring can be ensured more easily.

BRIEF DESCRIPTION OF DRAWINGS

FIG. 1 is a cross-sectional view of a pulley structure according to an embodiment of the present invention.

FIG. 2 is a cross-sectional view taken along line II-II of FIG. 1.

FIG. 3 is a cross-sectional view taken along line of FIG. 1.

FIG. 4 is a graph showing a relationship between torsional angle and torsional torque of a torsion coil spring of the pulley structure illustrated in FIG. 1.

FIG. 5 is a graph showing a relationship between the torsional torque and the maximum principal stress.

FIG. 6 is a schematic configuration view of an engine bench-testing machine used in a test in Examples.

DESCRIPTION OF EMBODIMENTS

Hereinafter, a pulley structure 1 according to an embodiment of the present invention will be described.

The pulley structure 1 of the present embodiment is installed on a driving shaft of an alternator in an accessory-driving system (not illustrated) of a vehicle. In addition, the pulley structure of the present invention may be installed on a driving shaft of an accessory machine other than the alternator.

As illustrated in FIG. 1 to FIG. 3, the pulley structure 1 includes an outer rotating body 2, an inner rotating body 3, a coil spring 4 (hereinafter, simply referred to as "spring 4"), and an end cap 5. Hereinafter, description will be given on the assumption that the left side in FIG. 1 is the front side and the right side is the rear side. The end cap 5 is disposed at a front end of the outer rotating body 2 and the inner rotating body 3.

Both the outer rotating body 2 and the inner rotating body 3 are substantially cylindrical and have a common rotation axis. The rotation axis of the outer rotating body 2 and the inner rotating body 3 is a rotation axis of the pulley structure 1, and hereinafter, simply referred to as "rotation axis". In addition, the rotation axis direction is simply referred to as "axial direction". The inner rotating body 3 is provided on the inside of the outer rotating body 2 and is relatively rotatable with respect to the outer rotating body 2. A belt B is wound around an outer circumferential surface of the outer rotating body 2.

The inner rotating body 3 has a cylindrical main body 3a and an outer cylindrical portion 3b disposed on the outside of the front end of the cylindrical main body 3a. A driving shaft S of an alternator or the like is fitted to the cylindrical main body 3a. A support groove portion 3c is formed between the outer cylindrical portion 3b and the cylindrical main body 3a. The inner circumferential surface of the outer cylindrical portion 3b and the outer circumferential surface of the cylindrical main body 3a are connected to each other via a groove bottom surface 3d of the support groove portion 3c.

A rolling bearing 6 is interposed between the inner circumferential surface on the rear end of the outer rotating body 2 and the outer circumferential surface of the cylindrical main body 3a. A sliding bearing 7 is interposed between the inner circumferential surface on the front end of the outer rotating body 2 and the outer circumferential surface of the outer cylindrical portion 3b. The outer rotating body 2 and the inner rotating body 3 are connected to each other so as to be relatively rotatable by the bearings 6 and 7.

An annular thrust plate 8 is disposed between the outer rotating body 2 and the inner rotating body 3 and in front of the rolling bearing 6. The thrust plate 8 is fixed to the inner rotating body 3 and rotates integrally with the inner rotating body 3. When assembling the pulley structure 1, the thrust plate 8 and the rolling bearing 6 are externally fitted to the cylindrical main body 3a in this order.

A space 9 is formed between the outer rotating body 2 and the inner rotating body 3 and in front of the thrust plate 8. The spring 4 is accommodated in the space 9. The space 9 is formed between the inner circumferential surface of the outer rotating body 2 and the inner circumferential surface of the outer cylindrical portion 3b and the outer circumferential surface of the cylindrical main body 3a.

The inner diameter of the outer rotating body 2 decreases rearward by two stages. The inner circumferential surface of the outer rotating body 2 at the smallest inner diameter part is referred to as a pressure contact surface 2a, and the inner circumferential surface of the outer rotating body 2 at the second smallest inner diameter part is referred to as an annular surface 2b. The inner diameter of the outer rotating body 2 at the pressure contact surface 2a is smaller than the inner diameter of the outer cylindrical portion 3b. The inner diameter of the outer rotating body 2 at the annular surface 2b is the same as or greater than the inner diameter of the outer cylindrical portion 3b.

The outer diameter of the cylindrical main body 3a becomes large at the front end. The outer circumferential surface of the inner rotating body 3 at this part is referred to as a contact surface 3e.

The spring 4 is a torsion coil spring formed by spirally winding (coiling) a spring wire (spring wire material). The spring 4 is wound leftward (counterclockwise from the front end toward the rear end). The number of windings N of the spring 4 is, for example, from 5 to 9. In the following description, the cross-section or the cross-sectional shape of the spring wire means a cross-section or a cross-sectional shape along the direction passing through the rotation axis and parallel to the rotation axis. The spring wire of the spring 4 is a trapezoidal wire having a trapezoidal cross-section. The four corners on the cross-section of the spring wire have chamfered shapes (e.g., R surface with a radius of curvature of approximately 0.3 mm, or C surface). The axial direction length of the spring wire at the inner diameter side part on the cross-section is referred to as an inner diameter side axial direction length Ti [mm]. The axial direction length of the spring wire at the outer diameter side part on the cross-section is referred to as an outer diameter side axial direction length To [mm]. The inner diameter side axial direction length Ti [mm] is longer than the outer diameter side axial direction length To [mm]. The number of windings N of the spring 4, the inner diameter side axial direction length Ti [mm], and the outer diameter side axial direction length To [mm] satisfy the following expression (1).

$$N \times (Ti - To)/2 < 1 \quad (1)$$

In a state where no external force is applied, the spring 4 has a constant diameter over the entire length. The outer diameter of the spring 4 in the state where no external force is applied is greater than the inner diameter of the outer rotating body 2 at the pressure contact surface 2a. The spring 4 is accommodated in the space 9 in a state where the diameter of a rear end side region 4c is reduced. The outer circumferential surface of the rear end side region 4c of the spring 4 is pressed against the pressure contact surface 2a by the self-elastic restoration force of the spring 4 in the diameter expansion direction. The rear end side region 4c is a region which is one round or more (360° or more around the rotation axis) from the rear end of the spring 4.

In addition, in a state where the pulley structure 1 is at rest and the outer circumferential surface of the rear end side region 4c of the spring 4 is pressed against the pressure contact surface 2a by the self-elastic restoration force in the diameter expansion direction of the spring 4, a front end side region 4b of the spring 4 is in contact with the contact surface 3e in a state where the diameter thereof slightly expands. In other words, in the state where the pulley structure 1 is at rest, the inner circumferential surface of the front end side region 4b of the spring 4 is pressed against the contact surface 3e. The front end side region 4b is a region which is one round or more (360° or more around the rotation axis) from the front end of the spring 4. In the state where no external force is applied to the pulley structure 1, the spring 4 has a substantially constant diameter over the entire length.

In the state where no external force acts on the pulley structure 1 (i.e., in the state where the pulley structure 1 is at rest), the spring 4 is compressed in the axial direction, a part in the circumferential direction (a half round or more from the front end) of the axial direction end surface of the front end side region 4b of the spring 4 comes into contact with the groove bottom surface 3d of the inner rotating body 3, and a part in the circumferential direction (a half round or more from the rear end) of the axial direction end surface of the rear end side region 4c of the spring 4 comes into contact with the front surface of the thrust plate 8. A compression ratio of the coil spring 4 in the axial direction may be, for example, approximately 20%. In addition, the compression ratio of the coil spring 4 in the axial direction is a ratio of the axial direction length of the spring 4 in the state where no external force acts on the pulley structure 1 to the natural length of the spring 4.

The groove bottom surface 3d is formed in a spiral shape so as to be capable of coming into contact with the part (a half round or more from the front end) of the axial direction end surface of the front end side region 4b. In addition, the front surface of the thrust plate 8 is formed in a spiral shape so as to be capable of coming into contact with the part (a half round or more from the rear end) of the axial direction end surface of the rear end side region 4c.

Although the groove bottom surface 3d of the support groove portion 3c and the part in the circumferential direction of the axial direction end surface of the front end side region 4b of the coil spring 4 are apparently in contact with each other over the entire region in the circumferential direction, there is a case in practice where a gap is formed at a part in the circumferential direction due to a processing tolerance of parts. The gap has a dimension (nominal dimension) taking into consideration the processing tolerance of the parts (e.g., a target value of the axial direction gap is 0.35 mm) with the aim that the gap becomes zero depending on the combination of finished actual size within the part tolerance. By bringing the gap as close as possible to zero, the spring 4 can stably undergo a torsional deformation.

As illustrated in FIG. 2, in the front end side region 4b, the vicinity of a position apart from the front end of the spring 4 by 90° around the rotation axis is referred to as a second region 4b2, a part further on the front end side from the second region 4b2 is referred to as a first region 4b1, and the remaining part is referred to as a third region 4b3. In addition, a region between the front end side region 4b and the rear end side region 4c of the spring 4, that is, a region which is not in contact with either the pressure contact surface 2a or the contact surface 3e is defined as a free part 4d.

As illustrated in FIG. 2, at the front end part of the inner rotating body 3, an abutting surface 3f which faces a front end surface 4a of the spring 4 is formed. In addition, the inner circumferential surface of the outer cylindrical portion 3b is provided with a projection 3g which protrudes radially inward on the outer cylindrical portion 3b and faces the outer circumferential surface of the front end side region 4b. The projection 3g faces the second region 4b2.

Next, the behavior of the pulley structure 1 will be described.

First, the case where the rotational speed of the outer rotating body 2 becomes higher than the rotational speed of the inner rotating body 3 (i.e., the case where the outer rotating body 2 accelerates) will be described.

In this case, the outer rotating body 2 relatively rotates with respect to the inner rotating body 3 in the forward direction (direction of arrows in FIG. 2 and FIG. 3). With the relative rotation of the outer rotating body 2, the rear end side region 4c of the spring 4 moves together with the pressure contact surface 2a and rotates relative to the inner rotating body 3. Accordingly, the spring 4 undergoes a torsional deformation in the diameter expansion direction (hereinafter, simply referred to as diameter expansion deformation). The pressure contact force of the rear end side region 4c of the spring 4 against the pressure contact surface 2a increases as the torsional angle of the spring 4 in the diameter expansion direction increases. The second region 4b2 is most likely to receive the torsional stress, and is separated from the contact surface 3e when the torsional angle of the spring 4 in the diameter expansion direction increases. At this time, the first region 4b1 and the third region 4b3 are in pressure contact with the contact surface 3e. The outer circumferential surface of the second region 4b2 abuts against the projection 3g at substantially the same time when the second region 4b2 becomes separated from the contact surface 3e or at the time when the torsional angle of the spring 4 in the diameter expansion direction further increases. As the outer circumferential surface of the second region 4b2 abuts against the projection 3g, the diameter expansion deformation of the front end side region 4b is restricted, the torsional stress is dispersed to a part other than the front end side region 4b of the spring 4, and in particular, the torsional stress acting on the rear end side region 4c of the spring 4 increases. Accordingly, since the difference in torsional stress acting on each part of the spring 4 is reduced and the strain energy can be absorbed by the entire spring 4, it is possible to prevent the local fatigue fracture of the spring 4.

Furthermore, the pressure contact force of the third region 4b3 against the contact surface 3e decreases as the torsional angle of the spring 4 in the diameter expansion direction increases. The pressure contact force of the third region 4b3 against the contact surface 3e becomes substantially zero at the same time when the second region 4b2 abuts against the projection 3g or at the time when the torsional angle of the spring 4 in the diameter expansion direction further increases. The torsional angle of the spring 4 in the diameter expansion direction at this time is denoted by θ1 (e.g., θ1=3°). When the torsional angle of the spring 4 in the diameter expansion direction exceeds θ1, the third region 4b3 becomes separated from the contact surface 3e due to the diameter expansion deformation. However, in the vicinity of the boundary between the third region 4b3 and the second region 4b2, the spring 4 is not curved (bent), and the front end side region 4b is maintained in an arc shape. In other words, the front end side region 4b is maintained in a shape that is easy to slide with respect to the projection 3g.

Therefore, when the torsional angle of the spring 4 in the diameter expansion direction increases and the torsional stress acting on the front end side region 4b increases, the front end side region 4b slides in the circumferential direction of the outer rotating body 2 with respect to the projection 3g and the contact surface 3e against the pressure contact force of the second region 4b2 against the projection 3g and the pressure contact force of the first region 4b1 against the contact surface 3e. In addition, as the front end surface 4a presses the abutting surface 3f, torque can be reliably transmitted between the outer rotating body 2 and the inner rotating body 3.

In addition, in the case where the torsional angle of the spring 4 in the diameter expansion direction is θ1 or more and less than θ2 (e.g., θ2=45°), the third region 4b3 is separated from the contact surface 3e and is not in contact with the inner circumferential surface of the outer cylindrical portion 3b, and the second region 4b2 is in pressure contact with the projection 3g. Therefore, in this case, compared to the case where the torsional angle of the spring 4 in the diameter expansion direction is less than θ1, the effective number of windings of the spring 4 is large and thus, the spring constant (inclination of the straight line shown in FIG. 4) is small. In addition, when the torsional angle of the spring 4 in the diameter expansion direction becomes θ2, as the outer circumferential surface of the free part 4d of the spring 4 abuts against the annular surface 2b, further diameter expansion deformation of the spring 4 is restricted, to trigger a lock mechanism in which the outer rotating body 2 and the inner rotating body 3 rotate integrally. Accordingly, breakage of the spring 4 due to the diameter expansion deformation can be prevented.

Next, the case where the rotational speed of the outer rotating body 2 becomes lower than the rotational speed of the inner rotating body 3 (i.e., the case where the outer rotating body 2 decelerates) will be described.

In this case, the outer rotating body 2 relatively rotates with respect to the inner rotating body 3 in the reverse direction (a direction opposite to the direction of arrows in FIG. 2 and FIG. 3). With the relative rotation of the outer rotating body 2, the rear end side region 4c of the spring 4 moves together with the pressure contact surface 2a and rotates relative to the inner rotating body 3. Accordingly, the spring 4 undergoes a torsional deformation in the diameter reduction direction (hereinafter, simply referred to as diameter reduction deformation). In the case where the torsional angle of the spring 4 in the diameter reduction direction is less than θ3 (e.g., θ3=10°), the pressure contact force of the rear end side region 4c against the pressure contact surface 2a slightly decreases compared to the case where the torsional angle is zero, but the rear end side region 4c is in pressure contact with the pressure contact surface 2a. In addition, the pressure contact force of the front end side region 4b against the contact surface 3e slightly increases compared to the case where the torsional angle is zero. In the case where the torsional angle of the spring 4 in the diameter reduction direction is θ3 or greater, the pressure contact force of the rear end side region 4c against the pressure contact surface 2a becomes substantially zero, and the rear end side region 4c slides on the pressure contact surface 2a in the circumferential direction of the outer rotating body 2. Therefore, torque is not transmitted between the outer rotating body 2 and the inner rotating body 3 (refer to FIG. 4).

In this manner, the spring 4 is a coil spring clutch and functions as a one-way clutch for transmitting or blocking torque in one direction. When the inner rotating body 3 relatively rotates with respect to the outer rotating body 2 in a forward direction, the spring 4 is engaged with each of the outer rotating body 2 and the inner rotating body 3 and transmits torque between the outer rotating body 2 and the inner rotating body 3. Meanwhile, when the inner rotating body 3 relatively rotates with respect to the outer rotating body 2 in a reverse direction, the spring 4 slides with respect to at least one of the outer rotating body 2 and the inner rotating body 3 (in the present embodiment, pressure contact surface 2a), and does not transmit torque between the outer rotating body 2 and the inner rotating body 3.

The thrust plate 8 rotates integrally with the inner rotating body 3. Therefore, when the clutch is in a disengaged state, the object on which the spring 4 slides is only the pressure contact surface 2a, and the axial direction end surface of the spring 4 does not slide on the thrust plate 8. In the above-described PTL 1, when the clutch is in a disengaged state, not only the coil spring slides on the pressure contact surface (inner circumferential surface) of the outer rotating body, but also the axial direction end surface of the coil spring slides on a spring bearing surface of the outer rotating body. In this case, as the coil spring is compressed in the axial direction, wear of the spring bearing surface progresses more than the extent of wear of the pressure contact surface, and there is a concern that a failure such as breakage of the spring bearing surface is caused. On the other hand, in the present embodiment, when the clutch is in a disengaged state, since the axial direction end surface of the spring 4 does not slide on the thrust plate 8, compared to the spring bearing surface of PTL 1, wear of the thrust plate 8 can be significantly suppressed and a failure caused by wear can be suppressed.

In addition, the thrust plate 8 does not slide on the spring 4 when the clutch is in a disengaged state, and is a separate part different from any of the inner rotating body 3 and the outer rotating body 2. Therefore, surface hardening treatment may not be performed with respect to the thrust plate 8. In addition, in the case where the surface hardening treatment is performed on the thrust plate 8, it is easy to perform the surface hardening treatment because the part is a separate part, and the surface hardness of the thrust plate 8 can be reliably increased to impart wear resistance against contact with the spring 4.

Here, the cross-sectional characteristics of the spring wire of the coil spring will be described.

In the cross-section of the spring wire, the position which does not receive tensile stress nor compressive stress when the coil spring undergoes torsional deformation is called a neutral axis. The neutral axis of the trapezoidal wire is close to a long side from the center in the height direction. Distances e from the neutral axis of a round wire (a spring wire having a circular cross-sectional shape), an angular wire (a spring wire having a square or rectangular cross-sectional shape) and a trapezoidal wire to the surface are expressed by the following equation, respectively.

Round wire: $e=d/2$ (here, d: diameter)

Angular wire: $e=h/2$ (here, h: height)

Trapezoidal wire: $e1=(3b1+2b2)H/3(2b1+b2), e2=H-e1$ (here, b1: short side length, b2: difference between long side and short side, H: height, e1>e2)

When the distance from the neutral axis is denoted by y, the bending moment is denoted by M, and the second moment of area is denoted by I, the bending stress σ generated in the coil spring is expressed by the following equation and is proportional to the distance y from the neutral axis.

$$\sigma = M \cdot y / I$$

Accordingly, the maximum principal stress (maximum value of bending stress) which is an indicator of the durability against torsion of the coil spring, is generated on the spring surface at which y becomes maximum and on which the tensile force acts.

The distances e from the neutral axis to the spring surface in the round wire, the angular wire and the trapezoidal wire having the same sectional area A, are compared to each other. Assuming sectional area A=100. In the case of the round wire, since d=11.284, e=d/2=5.642. In the case of the angular wire, when h=10, e=h/2=5.0. In the case of the trapezoidal wire, when H=10 (same height as that of the angular wire) and b1+b2=12, since b1=8 and b2=4, e1=(3b1+2b2) H/3 (2b1+b2)=5.33 and e2=H−e1=4.67. Accordingly, regarding the distance e from the neutral axis to the spring surface, the distance e2 from the neutral axis to the long side surface in the trapezoidal wire is the shortest among the round wire, the angular wire and the trapezoidal wire having the same sectional area A.

Therefore, in the case of a trapezoidal wire of which the axial direction length of the inner diameter side part is longer than the axial direction length of the outer diameter side, the neutral axis on which neither tensile stress nor compression stress generates can be brought closer to the inner circumferential surface of the coil spring on which a tensile force acts during the diameter expansion deformation, compared to the case of a round wire or an angular wire. As described above, since the bending stress is proportional to the distance from the neutral axis, by bringing the neutral axis closer to the inner circumferential surface of the coil spring on which the tensile force acts during the diameter expansion deformation, it is possible to reduce the maximum value of the bending stress generated on the inner circumferential surface of the coil spring on which the tensile stress acts during the diameter expansion deformation.

In addition, the bending stress σ generated in the coil spring is expressed by the following equation using the bending moment M and the section modulus Z.

$$\sigma = M/Z$$

Accordingly, as the section modulus Z increases, the bending stress σ decreases. In addition, the section modulus is a value representing easiness of bending of a member and resistance to bending (rigidity), for example, at the time when a bending external force is applied to the member, and is determined only by the shape of the cross-section. The section modulus Z is expressed by the following equation according to the second moment I of area and the distance y from the neutral axis.

$$Z = I/y$$

In addition, the second moment I of area of the trapezoidal wire is expressed by the following equation.

$$I = (6b1^2 + 6b1 b2 + b2^2) H^3 / 36(2b1+b2)$$

As described above, the maximum principal stress (maximum value of bending stress), which is an indicator of the durability against torsion of the coil spring, is generated on the spring surface at which the distance y from the neutral axis becomes maximum and on which the tensile force acts. In other words, in the case of the coil spring of the trapezoidal wire, the distance y from the neutral axis to the spring surface on which the tensile force acts and the maximum principal stress is generated is the distance e2 from the neutral axis to the long side surface. When, in the trapezoidal wire, the sectional area A=100, H=10, and b1+b2=12, as b1=8, b2=4, and e2=4.67, I=822.2 and Z=176.

In addition, each section modulus Z of the round wire and the angular wire is expressed by the following equation.

Round wire: $Z=\pi d3/32$ (here, d: diameter)

Angular wire: $Z=bh2/6$ (here, b: width, h: height)

In the case of the round wire, when the sectional area A=100, d=11.284 and Z=141. In the case of the angular wire, when the sectional area A=100, h=10 and b=10, Z=167.

Accordingly, in the case where a round wire, an angular wire and a trapezoidal wire have the same sectional area and the angular wire and the trapezoidal wire have the same radial direction length, the section modulus Z increases in the order of the round wire, the angular wire and the trapezoid wire. As described above, as the section modulus Z increases, the bending stress σ decreases. Therefore, in the case where a round wire, an angular wire and a trapezoidal wire have the same sectional area and the angular wire and the trapezoidal wire have the same radial direction length, in the order of the round wire, the angular wire and the trapezoidal wire, it is possible to more reduce the maximum value of the bending stress generated on the inner circumferential surface of the coil spring on which the tensile force acts during the diameter expansion deformation.

The pulley structure 1 of the present embodiment described above has the following characteristics.

The spring wire of the coil spring 4 of the present embodiment is a trapezoidal wire having a trapezoidal cross-sectional shape, and the axial direction length Ti of the inner diameter side on which a tensile force acts during the diameter expansion deformation is longer than the axial direction length To of the outer diameter side on which a compression force acts during the diameter expansion deformation. Therefore, compared to the case where the spring wire is a round wire having the same sectional area or an angular wire having the same sectional area and the same radial direction length, the neutral axis which does not receive tension or compression on the cross-section of the spring wire can be brought to be closer to the inner circumferential surface of the coil spring 4 on which the tensile force acts during the diameter expansion deformation. Since the bending stress is proportional to the distance from the neutral axis, by bringing the neutral axis closer to the inner circumferential surface of the spring 4 on which the tensile force acts during the diameter expansion deformation, it is possible to reduce the maximum value of the bending stress generated on the inner circumferential surface of the spring 4 on which the tensile stress acts during the diameter expansion deformation.

Furthermore, as the spring wire of the spring 4 is a trapezoidal wire, compared to a round wire having the same sectional area or an angular wire having the same sectional area and the same radial direction length, it is possible to increase the section modulus. As the section modulus increases, the bending stress decreases. Therefore, compared to the case where the spring wire is the round wire having the same sectional area or the angular wire having the same sectional area and the same radial direction length, it is possible to further reduce the maximum value of the bending stress generated on the inner circumferential surface of the spring 4 on which the tensile force acts during the diameter expansion deformation.

Therefore, even when the diameter expansion deformation of the spring 4 and the maximization thereof are excessively repeated according to the operating condition in which the initiating and stopping of the engine are repeated, compared to the case where the spring wire is a round wire or angular wire having the same sectional area, it is possible to reduce the maximum value of the bending stress generated on the inner circumferential surface of the spring 4 on which the tensile force acts during the diameter expansion deformation. As a result, the strength or the yield strength (bending rigidity) against instantaneous torsional torque generated at the time of initiation or the like can increase, and the limit value of the torsional angle of the spring 4 in the diameter expansion direction can increase. Furthermore, durability against torsion of the spring 4 can be ensured.

Compared to an angular wire having the same sectional area, the same radial direction length and a different axial direction length, the spring wire of the trapezoidal wire has a length in the axial direction of longer only by (Ti−To)/2. Accordingly, compared to the case where the spring wire is the angular wire having the same sectional area, the same radial direction length and a different axial direction length, the natural length of the spring 4 in the axial direction is longer by $\Delta L (\Delta L=N\times(Ti-To)/2)$.

However, in the present embodiment, the increase amount $\Delta L (\Delta L=N\times(Ti-To)/2)$ of the natural length of the spring 4 in the axial direction is as small as less than 1 mm. Therefore, when incorporating the spring 4 into the pulley structure 1, by adjusting a compression amount of the spring 4 in the axial direction (i.e., by adjusting a gap between adjacent spring wires in the axial direction), the size of the pulley structure 1 may not increase in the axial direction compared to the case where the spring wire is the angular wire having the same sectional area, the same radial direction length and a different axial direction length.

Therefore, in the pulley structure 1 of the present embodiment, even when the diameter expansion deformation of the spring 4 and the maximization thereof are excessively repeated, durability against torsion of the spring 4 can be ensured without causing an increase in size of the pulley structure 1 at least in the axial direction.

The spring 4 is formed by spirally winding (coiling) a spring wire. There is a case where a phenomenon occurs that the outer diameter side part (a surface on the outer diameter side) on the cross-section of the spring wire becomes an inclined surface inclined slightly (e.g., 1°) with respect to the outer diameter reference line parallel to the center axial line of the spring 4 (hereinafter, referred to as wire inclination) after coiling. The wire inclination of the spring 4 becomes larger as a flattening ratio (axial direction length T of spring wire/radial direction length W of spring wire) of the spring wire of the spring 4 becomes smaller. Therefore, by using a trapezoidal wire as the spring wire, compared to the case where an angular wire having the same sectional area, the same radial direction length and a different axial direction lengths is used as the spring wire, the maximum length in the axial direction in the cross-section of the spring wire increases, and the wire inclination can be restricted.

Furthermore, since the inner diameter side axial direction length Ti is longer than the outer diameter side axial direction length To, the neutral axis on which neither tensile stress nor compressive stress generates becomes close to the inner diameter side part having a long axial direction length from the center in the radial direction in the cross-section of the spring wire. Accordingly, it is possible to further suppress the wire inclination.

Suppression of the wire inclination reduces a surface pressure which acts on the part (in the present embodiment, pressure contact surface 2a) that slides on the spring 4 in the outer rotating body 2 and/or the inner rotating body 3 when the one-way clutch is in a disengaged state. Therefore, it is possible to suppress wear of the part that slides on the spring 4 in the outer rotating body 2 and/or the inner rotating body 3.

As above, it is possible to realize the pulley structure 1 which is capable of ensuring durability against torsion of the spring 4 and suppressing wear of the part that slides on the spring 4 in the outer rotating body 2 and/or the inner rotating body 3 without causing an increase in size of the pulley structure 1 at least in the axial direction, even when diameter expansion deformation of the spring 4 and the maximization thereof are excessively repeated.

When comparing the spring 4 of the present embodiment with a coil spring of an angular wire having the same sectional area and the same radial direction length in the degree of wire inclination, in the case where the wire inclination of the coil spring of the rectangular wire exceeds 1° (e.g., 1.2°), the spring 4 of the present embodiment can suppress the wire inclination to be 1° or less (e.g., 0.7°).

The spring wire of the spring 4 has a radial direction length W longer than the inner diameter side axial direction length Ti. Accordingly, the section modulus becomes larger as compared to the case where the cross-sectional shape of the spring wire material is a trapezoidal shape with the radial direction length W being shorter than or equal to the inner diameter side axial direction length Ti and with the same sectional area. Therefore, from the relationship between the bending stress and the section modulus (bending stress σ=bending moment M/section modulus Z), it is possible to further reduce the maximum value of bending stress generated on the inner circumferential surface of the spring 4 on which the tensile force acts during the diameter expansion deformation. As a result, durability against torsion of the spring 4 can be ensured more easily.

As above, although appropriate embodiments of the present invention have been described, the present invention is not limited to the above-described embodiments, and various changes can be made within the scope described in the claims.

The spring wire of the spring 4 of the above-described embodiment has a radial direction length W longer than the inner diameter side axial direction length Ti. However, the spring wire of the spring 4 may have the radial direction length W shorter than or equal to the inner diameter side axial direction length Ti.

The front end side region 4b of the spring 4 of the above-described embodiment is a region which is one round or more from the front end of the spring 4. In other words, the spring 4 comes into contact with the contact surface 3e over one round from the front end of the spring 4. However, the front end side region 4b of the spring 4 may be a region which is a half or more and less than one round from the front end of the spring 4. In other words, the spring 4 may come into contact with the contact surface 3e a half or more and less than one round from the front end of the spring 4.

The rear end side region 4c of the spring 4 of the above-described embodiment is a region which is one round or more from the rear end of the spring 4. In other words, the spring 4 comes into contact with the pressure contact surface 2a over one round from the rear end of the spring 4. However, the rear end side region 4c of the spring 4 may be a region which is a half or more and less than one round from the rear end of the spring 4. In other words, the spring 4 may come into contact with the pressure contact surface 2a a half or more and less than one round from the rear end of the spring 4.

In the pulley structure 1 of the above-described embodiment, the state where torque is transmitted between the outer rotating body 2 and the inner rotating body 3 and the state where the torque is blocked are switched with each other by switching the spring 4 between the state of being in pressure contact (engaged) with and the state of sliding on the outer rotating body 2 (pressure contact surface 2a). However, the pulley structure may be configured such that the state where torque is transmitted between the outer rotating body and the inner rotating body and the state where the torque is blocked are switched with each other by switching the coil spring between the state of being engaged with and the state of sliding on the inner rotating body. In addition, the pulley structure may be configured such that the state where torque is transmitted between the outer rotating body and the inner rotating body and the state where the torque is blocked are switched with each other by switching the coil spring between the state being engaged with and the state of sliding on both the inner rotating body and the outer rotating body.

EXAMPLE

Next, specific examples of the present invention will be described.

Example 1

The pulley structure of Example 1 had the same configuration as that of the pulley structure 1 of the above-described embodiment, and the spring wire of the coil spring (4) was oil tempered wire for a spring (in conformity with JIS G 3560: 1994). The spring wire was a trapezoidal wire, the inner diameter side axial direction length Ti was 3.8 mm, the outer diameter side axial direction length To was 3.6 mm, and the radial direction length W was 5.0 mm. The number of windings N of the coil spring (4) was 7, and the winding direction was a leftward direction. The compression ratio of the coil spring (4) in the axial direction was set to approximately 20%. The gap between the adjacent spring wires in the axial direction was 0.3 mm $\Delta L(\Delta L=N \times (Ti-To)/2)$ was 0.7 mm. In addition, when the spring wire having such a cross-sectional shape is used, for example, even in the case where the number of windings of the coil spring is 9 (maximum in general), the value of the above-described ΔL is 0.9 mm, which is less than 1 mm. In addition, the wire inclination of the coil spring was 0.7°. In other words, the outer diameter side part (the surface on the outer diameter side) in the cross-section of the spring wire was inclined by 0.7° with respect to the outer diameter reference line parallel to the center axial line of the cross-sectional coil spring of the spring wire.

The material of the thrust plate (8) was a cold rolled steel plate (SPCC) and a surface hardening treatment was performed thereto by a soft nitriding treatment. While the surface hardness (Vickers hardness) of the thrust plate (8) before the surface treatment was HV 180, the surface hardness after the surface treatment was approximately HV 600. The material of the outer rotating body (2) was carbon steel (S45C) and the surface hardening treatment was performed by soft nitriding treatment. While the surface hardness of the outer rotating body before the surface treatment was HV 200, the surface hardness after the surface treatment was HV 600.

Comparative Example 1

The pulley structure of Comparative Example 1 had the same configuration as that of the pulley structure of Example 1 except for the coil spring. The spring wire of the coil spring of Comparative Example 1 had the same configuration as that of the coil spring of Example 1 except that the spring wire was an angular wire having the same radial direction length W and the same sectional area as those of the spring wire of the trapezoidal wire of Example 1 described above. The axial direction length T on the cross-section of the spring wire was 3.7 mm. In addition, the wire inclination of the coil spring was 1.2°.

[Stress Distribution Simulation]

Regarding the coil springs of Example 1 and Comparative Example 1, the relationship between the torsional torque input when torsional deformation occurs in the diameter expansion direction (hereinafter, simply referred to as "diameter expansion deformation") and the maximum principal stress (maximum value of bending stress) generated on the surface (inner circumferential surface) of the coil spring was studied by simulation by a FEM (finite element method) analysis using a general purpose structural analysis software. The following conditions were set as boundary conditions of simulation.

The coil spring is compressed by 20% in the axial direction.

The torsional torque is applied to both the front end and the rear end of the coil spring in the direction of the diameter expansion deformation of the coil spring.

As a result of the simulation, in both Example 1 and Comparative Example 1, it was found that, when the torsional torque of 20 N·m was applied, the outer circumferential surface of the free part of the coil spring abuts against the annular surface (2b) of the outer rotating body (2), and further torsional deformation of the coil spring in the diameter expansion direction was restricted. In other words, it was found that the torsional deformation of the coil spring in the diameter expansion direction was maximized when the torsional torque of 20 N·m was applied to the coil spring. The torsional angle of the coil spring in the diameter expansion direction when the torsional deformation of the coil spring in the diameter expansion direction was maximum was approximately 70°. In addition, this result was identical to the result of measurement test of torsional torque (refer to FIG. 4).

As a result of the simulation, it was found that the maximum principal stress (the maximum value of bending stress) generated on the surface of the coil spring during the diameter expansion deformation is the highest on the inner circumferential surface of the coil spring on which tensile force acts during the diameter expansion deformation, by portion.

FIG. 5 is a graph showing the relationship between the torsional torque input to the coil spring and the maximum principal stress (maximum value of bending stress) of the coil spring, which was obtained by simulation. As apparent from FIG. 5, the coil spring of Example 1 in which the spring wire is a trapezoidal wire, compared to Comparative Example 1 in which the spring wire is an angular wire, it was found that it is possible to reduce the maximum principal stress (maximum value of bending stress) generated on the inner circumferential surface of the coil spring, which is an indicator of the durability against torsion of the coil spring, in a region having any torsional angle at the time of the diameter expansion deformation. In addition, the effect that Example 1 can reduce the maximum principal stress (maximum value of bending stress) generated on the inner circumferential surface of the coil spring as compared to Comparative Example 1, became the maximum when the torsional torque applied to the coil spring was the maximum (20 N·m was applied). Regarding the maximum principal stress (maximum value of bending stress) generated on the inner circumferential surface of the coil spring when the torsional torque was the maximum, the case of Example 1 (799 MPa) indicated a value lower than that of the case of Comparative Example 1 (867 MPa) by approximately 8%.

[Wear Resistance Test]

Regarding the pulley structures of Example 1 and Comparative Example 1, a wear resistance test was conducted by using an engine bench test machine 200 illustrated in FIG. 6. The engine bench test machine 200 is a test apparatus including an accessory-driving system and includes a crank pulley 201 attached to a crankshaft 211 of an engine 210, an AC pulley 202 connected to an air conditioner/compressor (AC), and a WP pulley 203 connected to a water pump (WP). The pulley structure 100 of Example 1 and Comparative Example 1 is connected to a shaft 221 of an alternator (ALT) 220. In addition, an auto tensioner (A/T) 204 is provided in the belt span between the crank pulley 201 and the pulley structure 100. The output of the engine is transmitted clockwise from the crank pulley 201 to each of the pulley structure 100, the WP pulley 203, and the AC pulley 202 via one belt (V-ribbed belt) 250, and each accessory machine (alternator, water pump, air conditioner/compressor) is driven.

At an ambient temperature of 90° C. and a belt tension of 1,500 N, the initiating and stopping of the engine was alternately repeated, and the test was completed when the number of times of initiating the engine reached 500,000 times that corresponds to the actual vehicle life. One operating time of the engine (time from the initiating to the stopping) was set to 10 seconds. In addition, the ambient temperature is a temperature set by assuming a temperature in a constant temperature chamber surrounding the alternator, the pulley structure and the crank pulley in an actual vehicle. In addition, the rotational speed of the crankshaft when initiating the engine every time fluctuated between 0 and 1,800 rpm. By repeating the initiating and stopping of the engine, the coil spring is alternately engaged with and slides on the pressure contact surface (2a) (hereinafter, referred to as a clutch engagement portion) of the outer rotating body (2).

After completion of the test, the pulley structure 100 was disassembled and the maximum wear depth of the clutch engagement portion (pressure contact surface) was measured. The results are illustrated in Table 1 below. In addition, in Table 1, the maximum value of the contact surface pressure which acts between the clutch engagement portion (pressure contact surface) and the coil spring obtained by calculation is also shown.

The case where the maximum wear depth of the clutch engagement portion (pressure contact surface) exceeds 0.15 mm, was considered as evaluation C (failed). The case where the maximum wear depth of the clutch engagement portion (pressure contact surface) is 0.15 mm or less was considered as evaluation B (passed), as a level capable of withstanding a practical use without a problem. The case where the maximum wear depth of the clutch engagement portion (pressure contact surface) is 0.075 mm or less (equal to or less than a half of the pass and fail determination level of 0.15 mm) was considered as A (passed), as a level capable of withstanding a practical use with a sufficient margin without a problem.

TABLE 1

| | Before test | | After test | |
|---|---|---|---|---|
| | Part | | | |
| Coil spring | Clutch engagement portion (pressure contact surface) | | | |
| | Evaluation item | | | |
| | Wire inclination [deg] | Maximum surface pressure [MPa] (calculated value) | Maximum wear depth [mm] | Evaluation |
| Example 1 | 0.7 | 12.0 | 0.075 | A |
| Comparative Example 1 | 1.2 | 13.5 | 0.100 | B |

As shown in Table 1, Example 1 had the higher wear suppressing effect with respect to the clutch engagement portion (pressure contact surface) than that of Comparative Example 1. From the result, it can be found that, as the wire inclination of the coil spring becomes smaller, the surface pressure which acts on the clutch engagement portion (pressure contact surface) by the coil spring decreases and the wear of the clutch engagement portion (pressure contact surface) can be suppressed. In addition, the reason why the evaluation of Comparative Example 1 in which the wire inclination of the coil spring is the largest was not C (failed) is considered that the surface hardening treatment is performed with respect to the pulley including the clutch engagement portion (pressure contact surface). In addition, the wear of the spring bearing surfaces of the thrust plates provided in Example 1 and Comparative Example 1 was minor, and a failure caused by the progress of wear was not observed.

The present invention is based on Japanese Patent Application No. 2016-090836 filed on Apr. 28, 2016 and Japanese Patent Application No. 2017-081321 filed on Apr. 17, 2017, the entire contents of which are incorporated herein by reference.

REFERENCE SIGNS LIST

1 PULLEY STRUCTURE
2 OUTER ROTATING BODY
2*a* PRESSURE CONTACT SURFACE
3 INNER ROTATING BODY
4 COIL SPRING
4*d* FREE PART

The invention claimed is:

1. A pulley structure comprising:
a cylindrical outer rotating body around which a belt is to be wound;
an inner rotating body provided on the inside of the outer rotating body and relatively rotatable with respect to the outer rotating body around a common rotation axis with the outer rotating body; and
a coil spring provided between the outer rotating body and the inner rotating body,
wherein the pulley structure further comprises a lock mechanism configured such that further torsional deformation in a diameter expansion direction of the coil spring is restricted and the outer rotating body and the inner rotating body rotate integrally with the coil spring when an outer circumferential surface of a free part of the coil spring abuts against the outer rotating body due to diameter expansion of the coil spring,
wherein the coil spring functions as a one-way clutch which is engaged with each of the outer rotating body and the inner rotating body due to torsional deformation in the diameter expansion direction to transmit torque between the outer rotating body and the inner rotating body when the inner rotating body relatively rotates with respect to the outer rotating body in a forward direction, and which slides with respect to at least one of the outer rotating body and the inner rotating body due to torsional deformation in a diameter reduction direction and does not transmit torque between the outer rotating body and the inner rotating body when the inner rotating body relatively rotates with respect to the outer rotating body in a reverse direction,
wherein a spring wire of the coil spring has a trapezoidal shape in a cross-section along a direction passing through the common rotation axis and parallel to the common rotation axis, and has a rotation axis direction length Ti (mm) at an inner diameter side part on the cross-section longer than a rotation axis direction length To (mm) at an outer diameter side part on the cross-section,
wherein the coil spring has a wire inclination where the outer diameter side part on the cross-section is an inclined surface inclined slightly, up to and including 1 degree, with respect to an outer diameter reference line parallel to the common rotation axis, and
wherein, when a number of windings of the coil spring is N, the following expression (1) is satisfied:

$$N \times (Ti - To)/2 < 1 \quad \ldots \quad (1).$$

2. The pulley structure according to claim 1,
wherein the spring wire of the coil spring has a radial direction length in the cross-section longer than the rotation axis direction length Ti of the inner diameter side part in the cross-section.

* * * * *